(12) United States Patent
Chan

(10) Patent No.: US 12,732,089 B2
(45) Date of Patent: Sep. 8, 2026

(54) POWER SUPPLY DEVICE WITH LOW LOSS

(71) Applicant: Acer Incorporated, New Taipei City (TW)

(72) Inventor: Tzu-Tseng Chan, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 142 days.

(21) Appl. No.: 18/950,586

(22) Filed: Nov. 18, 2024

(65) Prior Publication Data

US 2025/0385593 A1 Dec. 18, 2025

(30) Foreign Application Priority Data

Jun. 14, 2024 (TW) ................................ 113121984

(51) Int. Cl.

| | |
|---|---|
| ***H02M 1/00*** | (2006.01) |
| ***H02M 3/00*** | (2006.01) |
| ***H02M 3/335*** | (2006.01) |
| ***H02M 7/217*** | (2006.01) |

(52) U.S. Cl.

CPC ......... *H02M 1/007* (2021.05); *H02M 1/0012* (2021.05); *H02M 1/0025* (2021.05); *H02M 1/0048* (2021.05); *H02M 3/01* (2021.05); *H02M 3/33571* (2021.05); *H02M 7/217* (2013.01)

(58) Field of Classification Search

CPC ............. H02M 1/0012; H02M 1/0025; H02M 1/0048; H02M 1/007; H02M 3/01; H02M 3/33571; H02M 7/217

See application file for complete search history.

(56) References Cited

U.S. PATENT DOCUMENTS

| | | | | |
|---|---|---|---|---|
| 2015/0198634 A1* | 7/2015 | Brinlee | ................. | G01R 31/28 324/72.5 |
| 2019/0115837 A1* | 4/2019 | Fahlenkamp | ....... | H02M 1/4208 |
| 2024/0283366 A1* | 8/2024 | Chan | .................. | H02M 1/0009 |

* cited by examiner

*Primary Examiner* — Gary L Laxton
(74) *Attorney, Agent, or Firm* — McClure, Qualey & Rodack, LLP

(57) ABSTRACT

A power supply device with low loss includes a bridge rectifier, a boost inductor, a power switch element, a first output stage circuit, a switch circuit, a transformer, a resonant capacitor, a second output stage circuit, and a detection and control circuit. The power switch element selectively couples the boost inductor to a control node according to a first driving voltage. The resonant capacitor provides a capacitive voltage. The second output stage circuit includes a sense resistor. An output current flows through the sense resistor, such that a sense voltage difference is formed across the sense resistor. The detection and control circuit generates the first driving voltage, and determines a tunable voltage at the control node according to the capacitive voltage and the sense voltage difference.

15 Claims, 3 Drawing Sheets

POWER SUPPLY DEVICE WITH LOW LOSS

CROSS REFERENCE TO RELATED APPLICATIONS

This Application claims priority of Taiwan Patent Application No. 113121984 filed on Jun. 14, 2024, the entirety of which is incorporated by reference herein.

BACKGROUND OF THE INVENTION

Field of the Invention

The disclosure generally relates to a power supply device, and more specifically, to a power supply device with low loss.

Description of the Related Art

Power supply devices are indispensable elements in notebook computers. However, if the non-ideal loss of a power supply device is too large, it will tend to degrade the overall operational performance of the notebook computer. Accordingly, there is a need to propose a novel solution for solving this problem of the prior art.

BRIEF SUMMARY OF THE INVENTION

In an exemplary embodiment, the invention is directed to a power supply device with low loss. The power supply device includes a bridge rectifier, a boost inductor, a power switch element, a first output stage circuit, a switch circuit, a transformer, a resonant capacitor, a second output stage circuit, and a detection and control circuit. The bridge rectifier generates a rectified voltage according to a first input voltage and a second input voltage. The boost inductor receives the rectified voltage. The power switch element selectively couples the boost inductor to a control node according to a first driving voltage. The first output stage circuit is coupled to the boost inductor, and is configured to generate a median voltage. The switch circuit generates a switching voltage according to the median voltage, a second driving voltage, and a third driving voltage. The transformer includes a main coil, a first secondary coil, and a second secondary coil. A leakage inductor and a magnetizing inductor are built in the transformer. The main coil receives the switching voltage through the leakage inductor. The resonant capacitor is coupled to the magnetizing inductor, and is configured to provide a capacitive voltage. The second output stage circuit is coupled to the first secondary coil and the second secondary coil, and is configured to generate an output voltage and an output current. The second output stage circuit includes a sense resistor. The output current flows through the sense resistor, such that a sense voltage difference is formed across the sense resistor. The detection and control circuit generates the first driving voltage, the second driving voltage, and the third driving voltage. The detection and control circuit also determines a tunable voltage at the control node according to the capacitive voltage and the sense voltage difference.

In some embodiments, the bridge rectifier includes a first diode, a second diode, a third diode, and a fourth diode. The first diode has an anode coupled to a first input node for receiving the first input voltage, and a cathode coupled to a first node for outputting the rectified voltage. The second diode has an anode coupled to a second input node for receiving the second input voltage, and a cathode coupled to the first node. The third diode has an anode coupled to a ground voltage, and a cathode coupled to the first input node. The fourth diode has an anode coupled to the ground voltage, and a cathode coupled to the second input node. The boost inductor has a first terminal coupled to the first node for receiving the rectified voltage, and a second terminal coupled to a second node.

In some embodiments, the power switch element includes a first transistor. The first transistor has a control terminal for receiving the first driving voltage, a first terminal coupled the control node for receiving the tunable voltage, and a second terminal coupled to the second node.

In some embodiments, the first output stage circuit includes a fifth diode and a first capacitor. The fifth diode has an anode coupled to the second node, and a cathode coupled to a third node for outputting the median voltage. The first capacitor has a first terminal coupled to the third node, and a second terminal coupled to the ground voltage.

In some embodiments, the switch circuit includes a second transistor and a third transistor. The second transistor has a control terminal for receiving the second driving voltage, a first terminal coupled to a fourth node for outputting the switching voltage, and a second terminal coupled to the third node for receiving the median voltage. The third transistor has a control terminal for receiving the third driving voltage, a first terminal coupled to the ground voltage, and a second terminal coupled to the fourth node.

In some embodiments, the leakage inductor has a first terminal coupled to the fourth node for receiving the switching voltage, and a second terminal coupled to a fifth node. The main coil has a first terminal coupled to the fifth node, and a second terminal coupled to a sixth node. The magnetizing inductor has a first terminal coupled to the fifth node, and a second terminal coupled to the sixth node. The resonant capacitor has a first terminal coupled to the sixth node for outputting the capacitive voltage, and a second terminal coupled to the ground voltage. The first secondary coil has a first terminal coupled to a seventh node, and a second terminal coupled to a common node. The second secondary coil has a first terminal coupled to the common node, and a second terminal coupled to an eighth node.

In some embodiments, the second output stage circuit further includes a sixth diode, a seventh diode, and a second capacitor. The sixth diode has an anode coupled to the seventh node, and a cathode coupled to a ninth node. The seventh diode has an anode coupled to the eighth node, and a cathode coupled to the ninth node. The second capacitor has a first terminal coupled to an output node for outputting the output voltage, and a second terminal coupled to the common node. The sense resistor has a first terminal coupled to the ninth node, and a second terminal coupled to the output node.

In some embodiments, the detection and control circuit includes an MCU (Microcontroller Unit), a first averaging circuit, a second averaging circuit, and a reference resistor. The MCU generates the first driving voltage, the second driving voltage, the third driving voltage, and a fixed voltage. The first averaging circuit generates a first average voltage according to the capacitive voltage. The second averaging circuit generates an average current according to the sense voltage difference. The average current flows through the reference resistor, such that the reference resistor provides a second average voltage.

In some embodiments, the detection and control circuit further includes an adder and a subtractor. The adder adds the first average voltage to the second average voltage, so as to generate a sum voltage. The subtractor subtracts the sum voltage from the fixed voltage, so as to generate a differential voltage.

In some embodiments, if the differential voltage is lower than 0V, the MCU will stop outputting the first driving voltage. If the differential voltage is higher than or equal to 0V, the MCU will set the tunable voltage at the control node, such that the tunable voltage can be equivalent to the differential voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
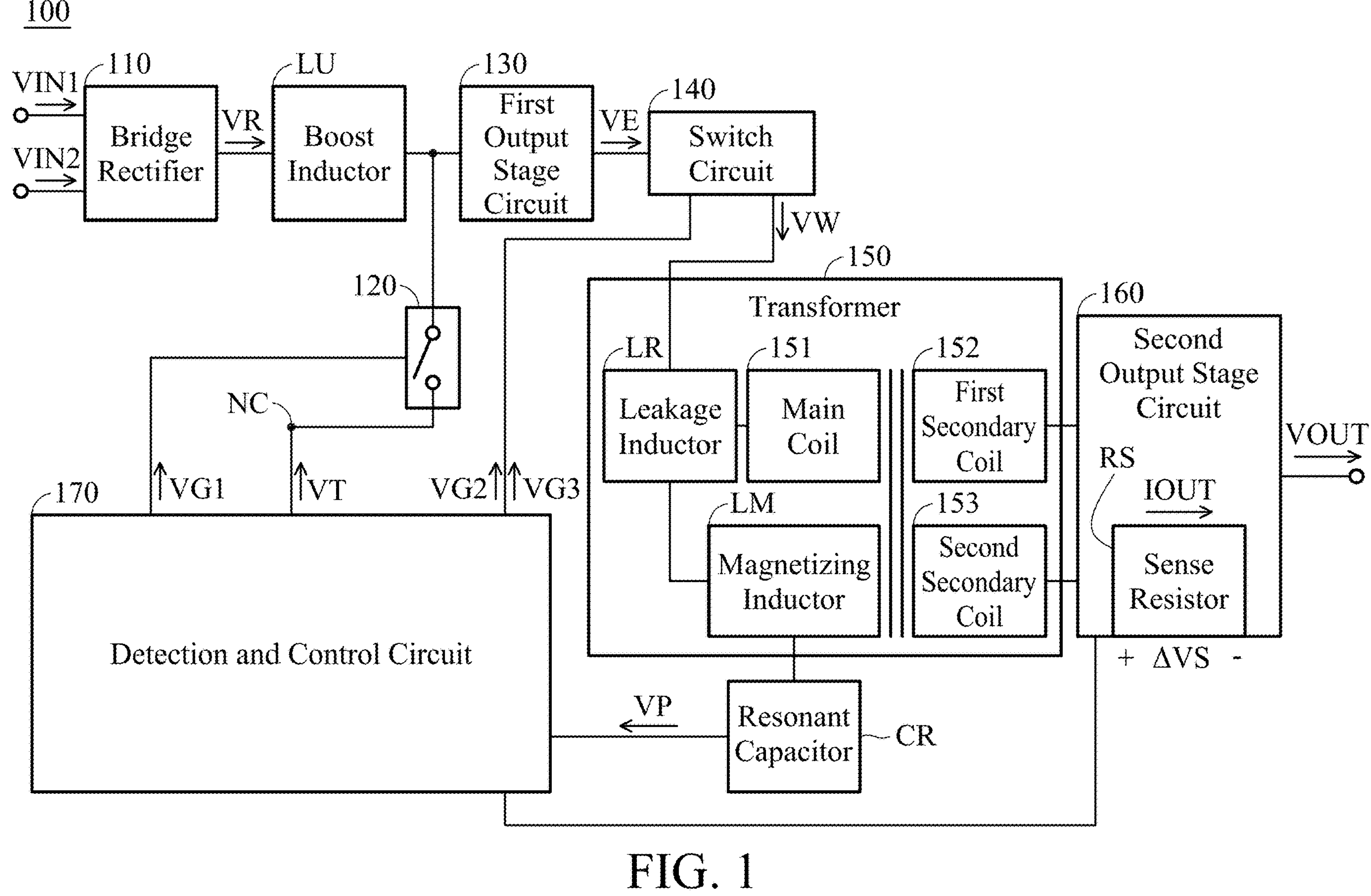
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a bridge rectifier 110, a boost inductor LU, a power switch element 120, a first output stage circuit 130, a switch circuit 140, a transformer 150, a resonant capacitor CR, a second output stage circuit 160, and a detection and control circuit 170. It should be noted that the power supply device 100 may further include other components, such as a voltage regulator and/or a negative feedback circuit, although they are not displayed in FIG. 1.

The bridge rectifier 110 generates a rectified voltage VR according to a first input voltage VIN1 and a second input voltage VIN2. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The boost inductor LU receives the rectified voltage VR. The power switch element 120 selectively couples the boost inductor LU to a control node NC according to a first driving voltage VG1. For example, if the first driving voltage VG1 has a high logic level (i.e., a logic "1"), the power switch element 120 may couple the boost inductor LU to the control node NC (i.e., the power switch element 120 is similar to a short-circuited path). Conversely, if the first driving voltage VG1 has a low logic level (i.e., a logic "0"), the power switch element 120 may not couple the boost inductor LU to the control node NC (i.e., the power switch element 120 is similar to an open-circuited path). The first output stage circuit 130 is coupled to the boost inductor LU, and is configured to generate a median voltage VE. The switch circuit 140 generates a switching voltage VW according to the median voltage VE, a second driving voltage VG2, and a third driving voltage VG3.

The transformer 150 includes a main coil 151, a first secondary coil 152, and a second secondary coil 153. A leakage inductor LR and a magnetizing inductor LM are built in the transformer 150. The leakage inductor LR, the magnetizing inductor LM, and the main coil 151 may be positioned at the same side of the transformer 150. The first secondary coil 152 and the second secondary coil 153 may be positioned at the opposite side of the transformer 150. The main coil 151 receives the switching voltage VW through the leakage inductor LR. The first secondary coil 152 and the second secondary coil 153 can be operated according to the switching voltage VW. The resonant capacitor CR is coupled to the magnetizing inductor LM. The resonant capacitor CR provides a capacitive voltage VP. For example, a resonant tank of the power supply device 200 may be formed by the leakage inductor LR, the magnetizing inductor LM, and the resonant capacitor CR.

The second output stage circuit 160 is coupled to the first secondary coil 152 and the second secondary coil 153, and is configured to generate an output voltage VOUT and an output current IOUT. For example, the output voltage VOUT may be a DC (Direct Current) voltage, whose voltage level may be from 18V to 22V, but it is not limited thereto. Specifically, the second output stage circuit 160 includes a sense resistor RS, and the output current IOUT flows through the sense resistor RS, such that a sense voltage difference ΔVS is formed across the sense resistor RS. The detection and control circuit 170 is coupled to the power switch element 120, the switch circuit 140, the resonant capacitor CR, and the second output stage circuit 160. The detection and control circuit 170 is configured to generate the first driving voltage VG1, the second driving voltage VG2, and the third driving voltage VG3. It should be noted that the detection and control circuit 170 can determine a tunable voltage VT at the control node NC according to the capacitive voltage VP and the sense voltage difference ΔVS, thereby adjusting different driving conditions of the power switch element 120. According to practical measurements, the proposed power supply device 100 of the invention can significantly reduce its overall loss, especially for the loss of the power switch element 120.

The following embodiments will introduce the detailed structure and operation of the power supply device 100. It should be understood these figures and descriptions are merely exemplary, rather than limitations of the invention.

Figure 2:
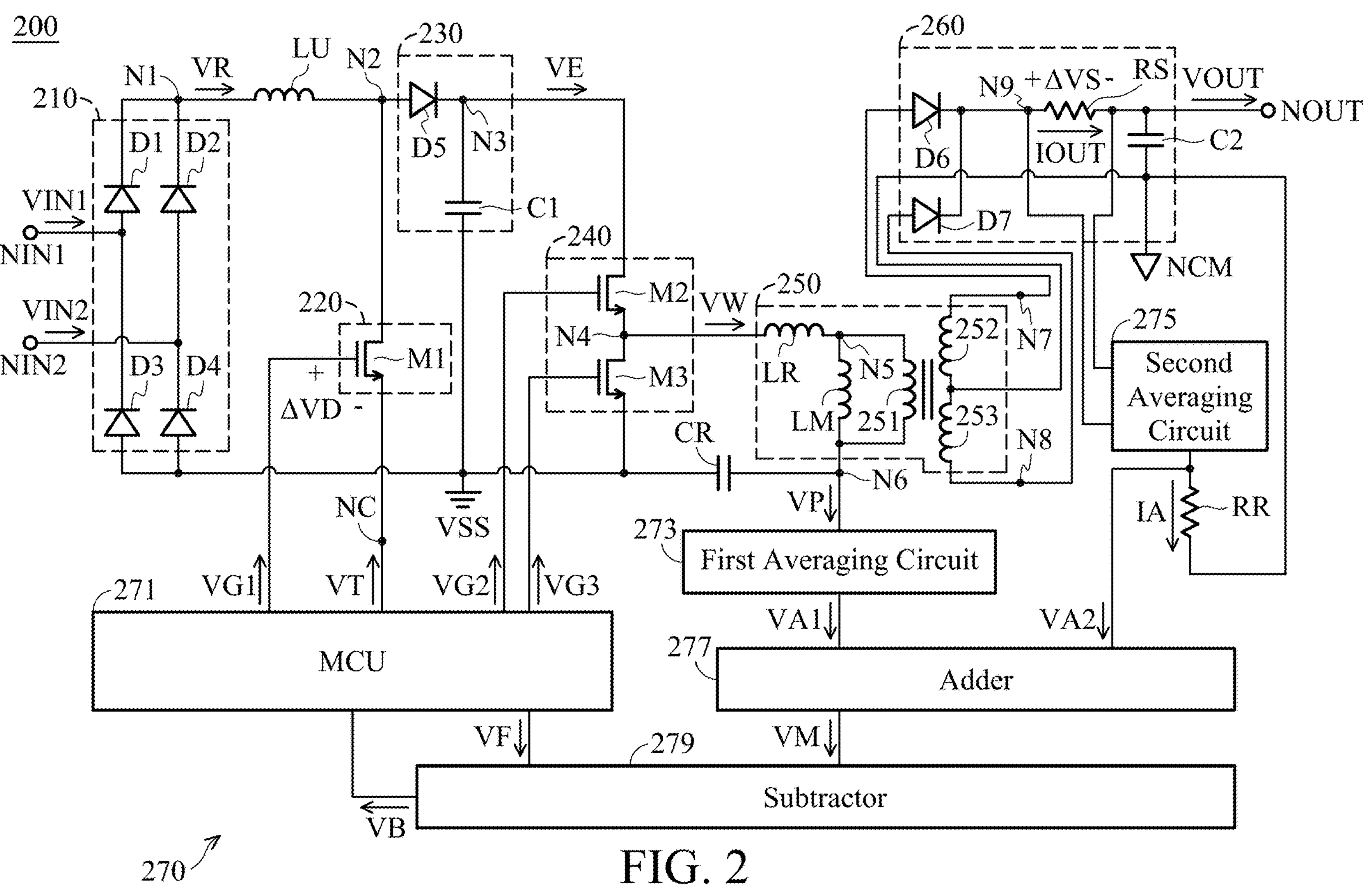
FIG. 2 is a diagram of circuitry of a power supply device according to an embodiment of the invention.

FIG. 2 is a diagram of circuitry of a power supply device 200 according to an embodiment of the invention. In the embodiment of FIG. 2, the power supply device 200 with a first input node NIN1, a second input node NIN2 and an output node NOUT includes a bridge rectifier 210, a boost inductor LU, a power switch element 220, a first output stage circuit 230, a switch circuit 240, a transformer 250, a resonant capacitor CR, a second output stage circuit 260, and a detection and control circuit 270. The first input node NIN1 and the second input node NIN2 of the power supply device 200 are arranged for receiving a first input voltage VIN1 and a second input voltage VIN2 from an external input power source (not shown), respectively. The output node NOUT of the power supply device 200 is arranged for outputting an output voltage VOUT to a system end, such as a notebook computer (not shown).

The bridge rectifier 210 includes a first diode D1, a second diode D2, a third diode D3, and a fourth diode D4. The first diode D1 has an anode coupled to the first input node NIN1, and a cathode coupled to a first node N1 for outputting a rectified voltage VR. The second diode D2 has an anode coupled to the second input node NIN2, and a cathode coupled to the first node N1. The third diode D3 has an anode coupled to a ground voltage VSS (e.g., 0V), and a cathode coupled to the first input node NIN1. The fourth diode D4 has an anode coupled to the ground voltage VSS, and a cathode coupled to the second input node NIN2.

The boost inductor LU has a first terminal coupled to the first node N1 for receiving the rectified voltage VR, and a second terminal coupled to a second node N2.

The power switch element 220 includes a first transistor M1. For example, the first transistor M1 may be an NMOSFET (N-type Metal Oxide Semiconductor Field Effect Transistor). The first transistor M1 has a control terminal (e.g., a gate) for receiving a first driving voltage VG1, a first terminal (e.g., a source) coupled to a control node NC for receiving a tunable voltage VT, and a second terminal (e.g., a drain) coupled to the second node N2. In some embodiments, it is considered that an effective driving voltage difference ΔVD is applied to the first transistor M1. The effective driving voltage difference ΔVD can be determined based on the following equation (1):

$$\Delta VD = VG1 - VT \tag{1}$$

where "ΔVD" represents the level of the effective driving voltage difference ΔVD, "VG1" represents the level of the first driving voltage VG1, and "VT" represents the level of the tunable voltage VT.

The first output stage circuit 230 includes a fifth diode D5 and a first capacitor C1. The fifth diode D5 has an anode coupled to the second node N2, and a cathode coupled to a third node N3 for outputting a median voltage VE. The first capacitor C1 has a first terminal coupled to the third node N3, and a second terminal coupled to the ground voltage VSS.

The switch circuit 240 includes a second transistor M2 and a third transistor M3. For example, each of the second transistor M2 and the third transistor M3 may be an NMOSFET. The second transistor M2 has a control terminal (e.g., a gate) for receiving a second driving voltage VG2, a first terminal (e.g., a source) coupled to a fourth node N4 for outputting a switching voltage VW, and a second terminal (e.g., a drain) coupled to the third node N3 for receiving the median voltage VE. The third transistor M3 has a control terminal (e.g., a gate) for receiving a third driving voltage VG3, a first terminal (e.g., a source) coupled to the ground voltage VSS, and a second terminal (e.g., a drain) coupled to the fourth node N4.

The transformer 250 includes a main coil 251, a first secondary coil 252, and a second secondary coil 253. A leakage inductor LR and a magnetizing inductor LM are built in the transformer 250. The leakage inductor LR and the magnetizing inductor LM are inherent elements, which are generated when the transformer 250 is manufactured, and they are not external independent elements. The leakage inductor LR, the main coil 251, and the magnetizing inductor LM may be positioned at the same side (e.g., the primary side) of the transformer 250. The first secondary coil 252 and the second secondary coil 253 may be positioned at the opposite side (e.g., the secondary side isolated from the primary side) of the transformer 250. The leakage inductor LR has a first terminal coupled to the fourth node N4 for receiving the switching voltage VW, and a second terminal coupled to a fifth node N5. The main coil 251 has a first terminal coupled to the fifth node N5, and a second terminal coupled to a sixth node N6. The magnetizing inductor LM has a first terminal coupled to the fifth node N5, and a second terminal coupled to the sixth node N6. The resonant capacitor CR has a first terminal coupled to the sixth node N6 for outputting a capacitive voltage VP, and a second terminal coupled to the ground voltage VSS. For example, a resonant tank of the power supply device 200 may be formed by the leakage inductor LR, the magnetizing inductor LM, and the resonant capacitor CR. The first secondary coil 252 has a first terminal coupled to a seventh node N7, and a second terminal coupled to a common node NCM. For example, the common node NCM may provide a common voltage, which may be considered as another ground voltage, and may be the same as or different from the aforementioned ground voltage VSS. The second secondary coil 253 has a first terminal coupled to the common node NCM, and a second terminal coupled to an eighth node N8.

The second output stage circuit 260 includes a sixth diode D6, a seventh diode D7, a second capacitor C2, and a sense resistor RS. The sixth diode D6 has an anode coupled to the seventh node N7, and a cathode coupled to a ninth node N9. The seventh diode D7 has an anode coupled to the eighth node N8, and a cathode coupled to the ninth node N9. The sense resistor RS has a first terminal coupled to the ninth node N9, and a second terminal coupled to the output node NOUT. For example, the resistance of the sense resistor RS may be smaller than or equal to 5Ω. The second capacitor C2 has a first terminal coupled to the output node NOUT, and a second terminal coupled to the common node NCM. In some embodiments, an output current IOUT of the second output stage circuit 260 flows through the sense resistor RS, such as a sense voltage difference ΔVS is formed across the sense resistor RS. The sense voltage difference ΔVS can be determined based on the following equation (2):

$$\Delta VS = IOUT \cdot RS \tag{2}$$

where "ΔVS" represents the level of the sense voltage difference ΔVS, "IOUT" represents the magnitude of the output current IOUT, and "RS" represents the resistance of the sense resistor RS.

The detection and control circuit 270 includes an MCU (Microcontroller Unit) 271, a first averaging circuit 273, a second averaging circuit 275, an adder 277, and a subtractor 279.

The MCU 271 generates the first driving voltage VG1, the second driving voltage VG2, the third driving voltage VG3, and a fixed voltage VF. For example, the first driving voltage VG1 may be a PWM (Pulse Width Modulation) voltage. The first driving voltage VG1 may be maintained at a constant voltage level when the power supply device 200 is initialized. The first driving voltage VG1 may provide a periodic clock waveform after the power supply device 200 is normally operated. In some embodiments, the second driving voltage VG2 and the third driving voltage VG3 have complementary logic levels. In addition, the fixed voltage VF may be from 5V to 8V, such as 6.5V, but it is not limited thereto.

The first averaging circuit 273 calculates the average value of the capacitive voltage VP, and generates a first average voltage VA1 according to the capacitive voltage VP. For example, the first average voltage VA1 may represent the average level of the capacitive voltage VP within a predetermined time period, but it is not limited thereto.

The second averaging circuit 275 calculates the average value of the sense voltage difference ΔVS, and generates an average current IA according to the sense voltage difference ΔVS. Next, the average current IA flows through a reference resistor RR. For example, the resistance of the reference resistor RR may be smaller than or equal to 5Ω. The reference resistor RR has a first terminal for outputting a second average voltage VA2, and a second terminal coupled to the common node NCM. In some embodiments, if the common voltage at the common node NCM is set to 0V and the resistance of the reference resistor RR is equal to that of the sense resistor RS, the second average voltage VA2 may represent the average level of the sense voltage difference ΔVS within a predetermined time period. The second average voltage VA2 can be determined based on the following equations (3) and (4):

$$IA = \frac{\Delta \mathrm{VS\_AVG}}{RS} \tag{3}$$

$$\mathrm{VA2} = RR \cdot IA = \Delta \mathrm{VS\_AVG} \tag{4}$$

where "IA" represents the magnitude of the average current IA, "ΔVS_AVG" represents the average level of the sense voltage difference ΔVS, "VA2" represents the level of the second average voltage VA2, "RS" represents the resistance of the sense resistor RS, and "RR" represents the resistance of the reference resistor RR.

The adder 277 has a first input terminal for receiving the first average voltage VA1, a second input terminal for receiving the second average voltage VA2, and an output terminal for outputting a sum voltage VM. Specifically, the adder 277 generates the sum voltage VM by adding the first average voltage VA1 to the second average voltage VA2, and it can be described based on the following equation (5):

$$\mathrm{V}M = \mathrm{VA1} + \mathrm{VA2} \tag{5}$$

where "VM" represents the level of the sum voltage VM, "VA1" represents the level of the first average voltage VA1, and "VA2" represents the level of the second average voltage VA2.

The subtractor 279 has a first input terminal for receiving the fixed voltage VF, a second input terminal for receiving the sum voltage VM, and an output terminal for outputting a differential voltage VB. Specifically, the subtractor 279 generates the differential voltage VB by subtracting the sum voltage VM from the fixed voltage VF, and it can be described based on the following equation (6):

$$\mathrm{V}B = \mathrm{V}F - \mathrm{V}M \tag{6}$$

where "VB" represents the level of the differential voltage VB, "VF" represents the level of the fixed voltage VF, and "VM" represents the level of the sum voltage VM.

Finally, the MCU 271 checks whether the differential voltage VB from the subtractor 279 is higher than or equal to 0V (or the ground voltage VSS). For example, if the differential voltage VB is lower than 0V, it may represent an abnormal event occurring in the power supply device 200, and the MCU 271 may immediately stop outputting the first driving voltage VG1. Conversely, if the differential voltage VB is higher than or equal to 0V, the MCU 271 may normally output the first driving voltage VG1, and may set the tunable voltage VT at the control node NC, such that the tunable voltage VT can be equivalent to the differential voltage VB. At this time, the aforementioned effective driving voltage difference ΔVD relative to the first transistor M1 can be determined based on the following equation (7):

$$\Delta \mathrm{V}D = \mathrm{V}G1 - \mathrm{V}B \tag{7}$$

where "ΔVD" represents the level of the effective driving voltage difference ΔVD, "VG1" represents the level of the first driving voltage VG1, and "VB" represents the level of the differential voltage VB.

Figure 3:
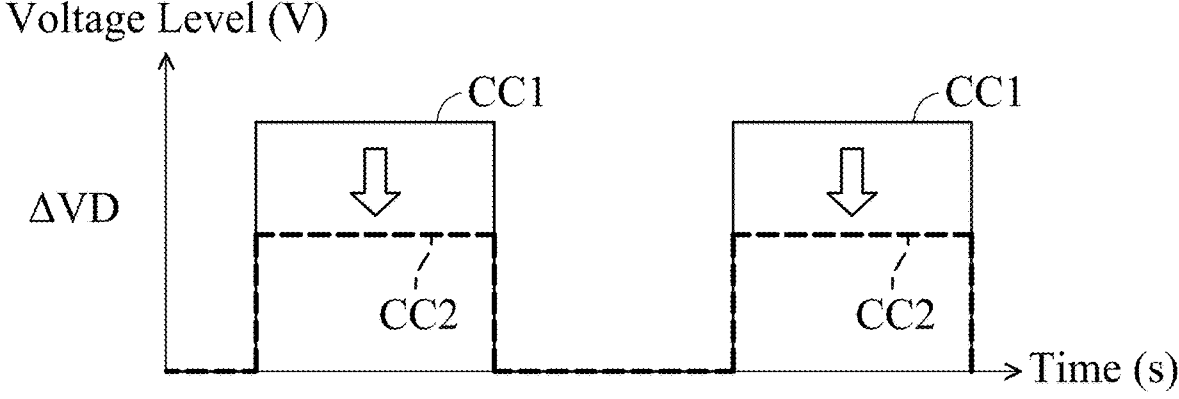
FIG. 3 is a diagram of a waveform of an effective driving voltage difference of a power supply device according to an embodiment of the invention.

FIG. 3 is a diagram of a waveform of the effective driving voltage difference ΔVD of the power supply device 200 according to an embodiment of the invention. The horizontal axis represents time(s), and the vertical axis represents the voltage level (V). As shown in FIG. 3, a first curve CC1 represents the characteristics of the effective driving voltage difference ΔVD when the power supply device 200 operates in a heavy-loading mode, and a second curve CC2 represents the characteristics of the effective driving voltage difference ΔVD when the power supply device 200 operates in a light-loading mode. According to the measurement of FIG. 3, since the average level of the effective driving voltage difference ΔVD of the first transistor M1 operating in the light-loading mode is relatively low, the turning-on loss and the switching loss of the power switch element 220 can be improved.

Figure 4:
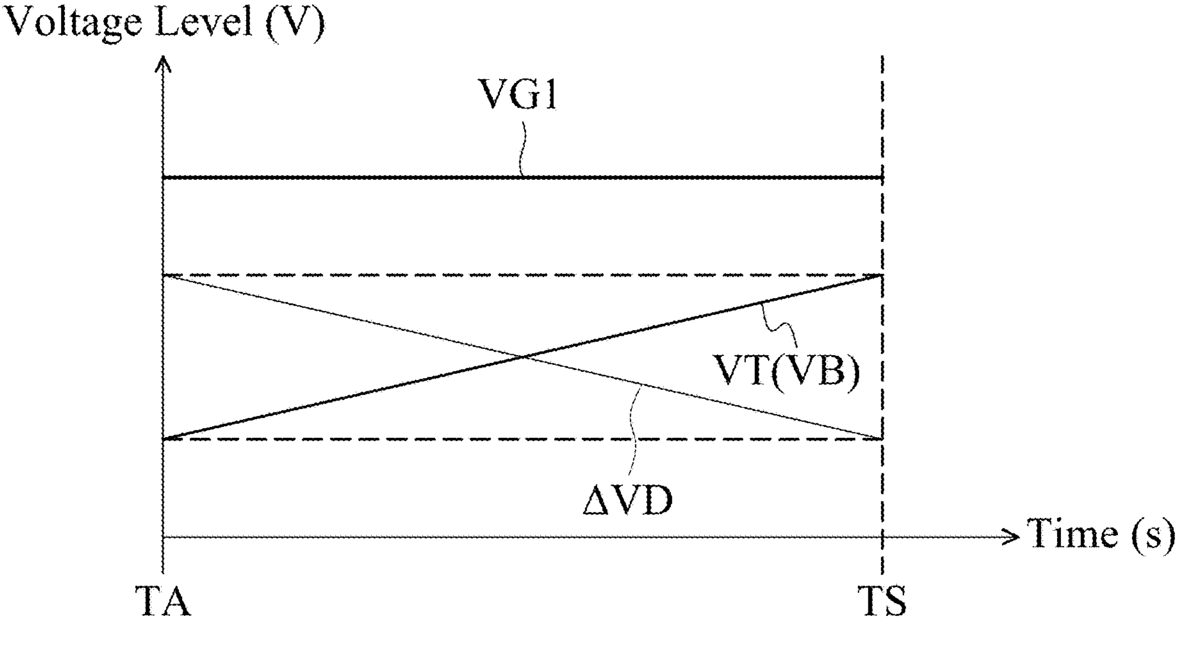
FIG. 4 is a diagram of signal waveforms of a power supply device according to an embodiment of the invention.

FIG. 4 is a diagram of signal waveforms of the power supply device 200 according to an embodiment of the invention. The horizontal axis represents time(s), and the vertical axis represents the voltage level (V). As shown in FIG. 4, at an initial time point TA, the power supply device 200 operates in the heavy-loading mode. In the heavy-loading mode, both the first average voltage VA1 and the second average voltage VA2 are relatively high, such that the differential voltage VB of the subtractor 279 is relatively low. Thus, the effective driving voltage difference ΔVD applied to the first transistor M1 can be maintained at a peak value, so as to enhance the driving capability of the power switch element 220.

Then, at a specific time point TS, the power supply device 200 can operates in the light-loading mode. That is, the power supply device 200 can be gradually switched from the heavy-loading mode to the light-loading mode. In the light-loading mode, both the first average voltage VA1 and the second average voltage VA2 are relatively low, such that the differential voltage VB of the subtractor 279 is relatively high. Thus, the effective driving voltage difference ΔVD applied to the first transistor M1 can be significantly suppressed, so as to reduce the overall loss of the power supply device 200 and the power switch element 220 thereof.

The invention proposes a novel power supply device. According to practical measurements, the power supply device using the aforementioned design can effectively improve the non-ideal loss, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-4. The invention may merely include any one or more features of any one or more embodiments of FIGS. 1-4. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device with low loss, comprising:

a bridge rectifier, generating a rectified voltage according to a first input voltage and a second input voltage;

a boost inductor, receiving the rectified voltage;

a power switch element, selectively coupling the boost inductor to a control node according to a first driving voltage;

a first output stage circuit, coupled to the boost inductor, and generating a median voltage;

a switch circuit, generating a switching voltage according to the median voltage, a second driving voltage, and a third driving voltage;

a transformer, comprising a main coil, a first secondary coil, and a second secondary coil, wherein a leakage inductor and a magnetizing inductor are built in the transformer, and the main coil receives the switching voltage through the leakage inductor;

a resonant capacitor, coupled to the magnetizing inductor, and providing a capacitive voltage;

a second output stage circuit, coupled to the first secondary coil and the second secondary coil, and generating an output voltage and an output current, wherein the second output stage circuit comprises a sense resistor, and the output current flows through the sense resistor, such that a sense voltage difference is formed across the sense resistor; and a detection and control circuit, generating the first driving voltage, the second driving voltage, and the third driving voltage;

wherein the detection and control circuit determines a tunable voltage at the control node according to the capacitive voltage and the sense voltage difference.

2. The power supply device as claimed in claim 1, wherein the bridge rectifier comprises:

a first diode, wherein the first diode has an anode coupled to a first input node for receiving the first input voltage, and a cathode coupled to a first node for outputting the rectified voltage;

a second diode, wherein the second diode has an anode coupled to a second input node for receiving the second input voltage, and a cathode coupled to the first node;

a third diode, wherein the third diode has an anode coupled to a ground voltage, and a cathode coupled to the first input node; and a fourth diode, wherein the fourth diode has an anode coupled to the ground voltage, and a cathode coupled to the second input node;

wherein the boost inductor has a first terminal coupled to the first node for receiving the rectified voltage, and a second terminal coupled to a second node.

3. The power supply device as claimed in claim 2, wherein the power switch element comprises:

a first transistor, wherein the first transistor has a control terminal for receiving the first driving voltage, a first terminal coupled the control node for receiving the tunable voltage, and a second terminal coupled to the second node.

4. The power supply device as claimed in claim 2, wherein the first output stage circuit comprises:

a fifth diode, wherein the fifth diode has an anode coupled to the second node, and a cathode coupled to a third node for outputting the median voltage; and a first capacitor, wherein the first capacitor has a first terminal coupled to the third node, and a second terminal coupled to the ground voltage.

5. The power supply device as claimed in claim 4, wherein the switch circuit comprises:

a second transistor, wherein the second transistor has a control terminal for receiving the second driving voltage, a first terminal coupled to a fourth node for outputting the switching voltage, and a second terminal coupled to the third node for receiving the median voltage; and a third transistor, wherein the third transistor has a control terminal for receiving the third driving voltage, a first terminal coupled to the ground voltage, and a second terminal coupled to the fourth node.

6. The power supply device as claimed in claim 5, wherein the leakage inductor has a first terminal coupled to the fourth node for receiving the switching voltage, and a second terminal coupled to a fifth node, wherein the main coil has a first terminal coupled to the fifth node, and a second terminal coupled to a sixth node, wherein the magnetizing inductor has a first terminal coupled to the fifth node, and a second terminal coupled to the sixth node, wherein the resonant capacitor has a first terminal coupled to the sixth node for outputting the capacitive voltage, and a second terminal coupled to the ground voltage, wherein the first secondary coil has a first terminal coupled to a seventh node, and a second terminal coupled to a common node, and wherein the second secondary coil has a first terminal coupled to the common node, and a second terminal coupled to an eighth node.

7. The power supply device as claimed in claim 6, wherein the second output stage circuit further comprises:

a sixth diode, wherein the sixth diode has an anode coupled to the seventh node, and a cathode coupled to a ninth node;

a seventh diode, wherein the seventh diode has an anode coupled to the eighth node, and a cathode coupled to the ninth node; and a second capacitor, wherein the second capacitor has a first terminal coupled to an output node for outputting the output voltage, and a second terminal coupled to the common node;

wherein the sense resistor has a first terminal coupled to the ninth node, and a second terminal coupled to the output node.

8. The power supply device as claimed in claim 1, wherein the detection and control circuit comprises:

an MCU (Microcontroller Unit), generating the first driving voltage, the second driving voltage, the third driving voltage, and a fixed voltage.

9. The power supply device as claimed in claim 8, wherein the detection and control circuit further comprises:

a first averaging circuit, generating a first average voltage according to the capacitive voltage.

10. The power supply device as claimed in claim 9, wherein the detection and control circuit further comprises:

a second averaging circuit, generating an average current according to the sense voltage difference.

11. The power supply device as claimed in claim 10, wherein the detection and control circuit further comprises:

a reference resistor, wherein the average current flows through the reference resistor, and the reference resistor provides a second average voltage.

12. The power supply device as claimed in claim 11, wherein the detection and control circuit further comprises:

an adder, adding the first average voltage to the second average voltage, so as to generate a sum voltage.

13. The power supply device as claimed in claim 12, wherein the detection and control circuit further comprises:

a subtractor, subtracting the sum voltage from the fixed voltage, so as to generate a differential voltage.

14. The power supply device as claimed in claim 13, wherein if the differential voltage is lower than 0V, the MCU stops outputting the first driving voltage.

15. The power supply device as claimed in claim 13, wherein if the differential voltage is higher than or equal to 0V, the MCU sets the tunable voltage at the control node, such that the tunable voltage is equivalent to the differential voltage.

* * * * *